Patented Nov. 23, 1948

2,454,404

UNITED STATES PATENT OFFICE 2,454,404

PREPARATION OF PIPERAZINE

Harry Fred Pfann, Greenwich, and James Kenneth Dixon, Riverside, Conn., assignors to American Cyanamid Company, New York, N. Y., a corporation of Maine No Drawing. Application October 3, 1942, Serial No. 460,684

10 Claims. (Cl. 260—268)

This invention relates to the production of piperazines by the catalytic deamination of alkylene polyamines. More particularly the invention relates to the intra-molecular deamination of diethylene triamine to produce piperazine by vapor phase catalysis.

Various six membered cyclic nitrogen bases, previously known but little used, have in recent years become of increasing industrial importance. Piperazine, for example, is an excellent illustration. The physical properties of piperazine have been known for many years, yet commercially it has been of very little importance. Recently, however, the demand for piperazine has been steadily increasing. Piperazine is useful in pharmaceuticals and as a starting material for the manufacture of pyrazine, which is in turn, of importance as an intermediate in the preparation of dyestuffs and pharmaceuticals.

This demand, however, could not be readily satisfied since methods suitable for the large scale production of piperazine on a commercially feasible basis were lacking. The available supply was obtained by the use of relatively expensive and inefficient chemical procedures. One such method comprised the direct amination of an alkylene dihalide, such as ethylene dibromide. This procedure was difficult to control and gave very poor yields. Most of the alkylene dihalide was converted to a mixture of alkylene polyamines such as ethylene diamine, diethylene triamine, triethylene tetramine and the like. In fact the process amounted to little more than recovering one of the minor by-products in the production of these alkylene polyamines.

Perhaps the most commonly used process was to react an alkylene dihalide, such as the aforementioned ethylene dibromide, with an amine such as aniline. This resulted in the production of a small yield of N,N'-phenyl substituted piperazine which could be subsequently split by chemical reaction. Neither of these processes, however, gave particularly good yields and both were very difficult to control.

As a result of the demand being greater than the available supply due to the difficulties in the manufacturing procedures, the cost of piperazine remained relatively high. In some cases this precluded the use of piperazine since the high cost rendered otherwise desirable procedures economically unfeasible. Again, because the demand exceeded the available supply, the commercial development of many of its desirable uses was held back.

More recently the production of piperazine by the catalytic deamination and cyclization of alkylene polyamines has been proposed as a more suitable process. This was carried out in the liquid phase, at about 250° C., using metallic copper, nickel, cobalt or platinum as a catalyst. Yields as high as 50% of theoretical have been claimed for this procedure although in actual practice about 35% is more nearly the yield which can be reasonably anticipated.

This process, however, suffers from a number of inherent disadvantages. First of all, it is strictly a batch operation and can not be readily adapted for continuous production. It requires the admixture of catalyst and reactants with the subsequent step of separating the catalyst from the product. It requires a long time of reaction, on the order of magnitude of about 24 hours, to obtain a satisfactory yield. Finally, the pressures involved are quite high, requiring apparatus capable of handling pressures on the order of magnitude of 1000 to 1500 lb./sq. in., so that the apparatus cost for the production of any but exceedingly small batches is excessive.

Accordingly, there remains a definite demand for a process whereby cyclic nitrogen bases such as piperazine may be prepared easily, cheaply, in good yields and on a commercially feasible scale. It is, therefore, an object of the present invention to provide an improved process, relatively simple and efficient in operation, for the production of such materials along a feasible basis.

In general the object of the present invention is accomplished by carrying out the reaction in the vapor phase using an entirely different type of catalyst than the ones proposed for use in the liquid phase. The process of the present invention comprises the general steps of vaporizing the alkylene polyamine, passing the vaporized material over a suitable catalyst at elevated temperatures, condensing the reacted vapors and isolating the cyclic base from the condensate.

By carrying out the production of piperazine and the like according to the process of the present invention, a number of important advantages are obtained. An appreciable improvement in overall efficiency of conversion is obtained. The reaction time is reduced from about 24 hours to a few minutes. The necessity for excessively strong, cumbersome and expensive apparatus is eliminated. The process can be readily carried out on a continuous basis and is practical for use in large scale production.

The process of the present invention is not necessarily limited to the production of any particular cyclic nitrogen base or to the use of any particular material as a starting point. In the foregoing discussion, piperazine has been used merely for purposes of illustration. Because its production is typical of the process of the present invention and the products which can be produced, it will be so used throughout the remainder of the specification and claims.

Similarly diethylene triamine will be used as illustrative of the alkylene polyamines which can be successfully treated according to the present process. It should be noted, however, that the invention is not intended to be so limited. For example, piperazine may also be prepared from ethylene diamine. Similarly substituted piperazines may also be prepared from homologs of diethylene triamine such as 2-amino-propyl ethylene diamine or bis-2-amino propyl amine. Nor is the process necessarily limited to the use of the pure amines. Piperazine, for example, may be prepared from a mixture of ethylene diamine and diethylene triamine as well as from certain volatilizable salts thereof or mixtures of these salts.

Several catalysts have been found suitable for use in the process of the present invention. Among the most satisfactory of these are "activated alumina," bauxite, certain aluminum silicates such as kaolin and oxides of thorium, titanium, zirconium and the like. "Activated alumina" as used in the present specification and claims refers to the commercial product produced by such processes as those illustrated for example in U. S. Patents 1,868,869 and 2,015,593.

Not all of the materials suitable for use as catalysts are always readily available. However, of the catalysts which are readily available, activated alumina appears to give slightly better yields and therefore is perhaps preferable. The invention, however, is not necessarily so limited. Practically, mixtures of catalyst bodies may be used or the catalytic zone may be divided into a plurality of zones, a different catalyst being used in each.

Practice of the present invention does not require the use of any particular apparatus. It is only necessary that there be a suitable means for passing the vaporized material over the heated catalyst. The reacted vapors may be condensed and the product isolated by any desired means. Each of the elements of this apparatus may be varied almost at will so long as the intended function is accomplished.

The operating temperature at which the catalyst is maintained will vary somewhat in accordance with the particular circumstances. Good results were obtained, for example, using temperatures from about 300 to 600° C. with activated alumina as a catalyst. Above about 550° C. the yield tends to decrease due to the increased side reactions. Below about 350° C., the yield falls off quite appreciably. It has been found that one of the important factors in fixing the temperature is the time of contact. Preferably the temperature was maintained at about 425° C. and the time of contact adjusted by varying the rate of feed or by varying the amount of diluent gas used to sweep the vapors through the apparatus. It was found that conversions as high as 25% were obtainable in a single pass through the apparatus at the optimum temperature and that by recycling the unchanged material an overall efficiency of about 60-70% was obtained.

After condensing the vapors the desired product may be isolated in any one of several ways. Perhaps the simplest means of isolating the base is by fractional distillation. Piperazine, for example, having a boiling point of about 146° C., in the present case is difficultly separable from the other products of the reaction. Therefore, cuts must be collected and further purified by refractionation. If so desired sufficient water may be added to the condensate to convert the piperazine to its hydrate which in turn forms with water, a mixture which boils at a lower temperature than anhydrous piperazine and may be collected per se.

When it is desirable to do so, the catalyst may be readily reactivated. This can be done for example by heating the catalyst in a confined space while passing air through the mass to burn off the impurities. The actual temperature to which the material is heated will vary with the rate of air flow through the mass. Care should be taken, however, to maintain an air flow such that the temperature of the mass will be maintained below the point at which sintering will occur. With activated alumina, for example, it is well to maintain the temperature below about 700° C. The reactivation of the cataylst, however, forms no part of the present invention.

As has been noted above, in the case of certain catalysts, an increase in the amount of permanent gases leaving the apparatus over that which was fed is obtained. Part of this increase is due to the formation of ammonia. An appreciable portion of it, however, is due to the evolution of hydrogen by the dehydrogenation of some of the reaction products. Where piperazine is to be produced the dehydrogenation is undesirable and may be reduced to a minimum by replacing all or a part of the diluent gas with hydrogen.

This tendency toward dehydrogenation results in the formation of a certain amount of pyrazine. Where the piperazine is being prepared as in intermediate for the production of pyrazine, this tendency may be turned to advantage. Instead of minimizing the dehydrogenation it may be promoted to enable the production of pyrazine directly in a single stage process. This procedure, whereby pyrazine may be formed directly from the amines, comprises a part of the subject matter of the copending application of H. F. Pfann, Serial No. 464,108, filed October 31, 1942, now Patent No. 2,414,552, dated January 21, 1947.

The invention will be described in greater detail in conjunction with the following specific examples which are meant to be merely illustrative and do not in any way limit the invention. The parts are by weight unless otherwise noted.

*Example 1*

Diethylene triamine was fed at the rate of about 3 gms./min. to a vaporizor maintained at about 260–300° C. The vaporized material was diluted with about 250 ml./min. nitrogen gas and passed over a catalyst comprising about 250 ml. of 8 to 14 mesh activated alumina maintained at about 440–460° C. The reaction products were then passed through a condensing system from which liquid was collected at the rate of about 2 gms./min. indicating a liquid recovery of about 66%. An appreciable amount of non-condensible gas was formed during the reaction. The condensate was worked up by fractional distillation, the fractions boiling from 130 to 170° C. being collected as product and purified by refractionation, the fraction distilling from 142–150° C. collected as final product.

*Example 2*

The procedure of Example 1 was repeated replacing the diluent nitrogen gas with hydrogen.

A comparable fraction of final product having substantially the same boiling point was collected.

Example 3

The procedure of Example 2 was repeated using a mixed catalyst comprising about 75% activated alumina and 25% titanium dioxide with approximately the same results.

Example 4

The procedure of Example 2 was repeated using an average catalyst temperature of about 520–550° C. This produced a decrease in yield indicating that the temperature was higher than the optimum.

Example 5

The procedure of Example 1 was repeated using a double catalyst comprising 8 to 14 mesh activated alumina followed by copper chromite on activated alumina. A marked increase in the volume of non-condensible gas indicated the presence of a different side reaction. The condensate was diluted with about 6 pts./pt. of water and steam distilled, the product being collected as piperazine hexahydrate. Analysis of the combined low boiling fractions showed a small amount of pyrazine to be present.

Example 6

The procedure of Example 5 was repeated replacing the nitrogen with hydrogen. A slightly greater yield of piperazine hexahydrate was obtained and the combined low boiling fractions were found to contain only a very small amount of pyrazine.

We claim:

1. A method of producing piperazines from alkylene amines which comprises vaporizing a material selected from the group consisting of the alkylene diamines and dialkylene triamines having two terminal primary amino groups and in which the amino groups are each separated by two carbon atoms, their volatilizable salts and mixtures of the same, heating the vaporized material at from about 350–400° C. and passing the heated vapors over a deamination catalyst maintained at elevated temperatures of from about 350–550° C. whereby cyclization of the alkylene amine is obtained and ammonia is eliminated, condensing the condensible reaction products, collecting the condensate and isolating the piperazine therefrom.

2. A method according to claim 1 characterized in that the catalyst is maintained at temperatures of from about 400–500° C.

3. A method according to claim 1 characterized in that the catalyst is selected from the group consisting of the oxides of aluminum, silicon, thorium, titanium and zirconium and mixtures of the same.

4. A method of producing piperazines from alkylene amines which comprises vaporizing a mixture comprising ethylene diamine and diethylene triamine, heating the vaporized material at about 350–400° C. passing the heated vapors over a deamination catalyst maintained at elevated temperatures of from about 350–550° C. whereby cyclization of the alkylene amine is obtained and ammonia is eliminated, condensing the condensible reaction products, collecting the condensate and isolating the piperazine from the condensed material.

5. A method according to claim 4 characterized in that the catalyst is selected from the group consisting of the oxides of aluminum, silicon, thorium, titanium and zirconium and mixtures of the same.

6. A method according to claim 4 characterized in that the vaporized material is diluted with a gas.

7. A method according to claim 4 characterized in that the vaporized material is diluted with a gas at least a portion of which comprises hydrogen.

8. A method according to claim 4 characterized in that the temperature is maintained from about 400–500° C.

9. A method according to claim 4 characterized in that the catalyst comprises an oxide of aluminum.

10. A method according to claim 4 characterized in that the catalyst comprises an oxide of titanium.

HARRY FRED PFANN.
JAMES KENNETH DIXON.

REFERENCES CITED

The following references are of record in the file of this patent:

UNITED STATES PATENTS

| Number | Name | Date |
|---|---|---|
| 2,019,883 | Wulff et al. | Nov. 5, 1935 |
| 2,136,094 | Wilson | Nov. 8, 1938 |
| 2,267,686 | Kyrides | Dec. 23, 1941 |

OTHER REFERENCES

Astonetal Jour. Am. Chem. Soc. 56, 153–4 (1934).